United States Patent
Paek et al.

(10) Patent No.: US 8,949,984 B2
(45) Date of Patent: Feb. 3, 2015

(54) PERSONAL INFORMATION PROTECTION SYSTEM FOR PROVIDING SPECIALIZED FUNCTION FOR HOST TERMINAL BASED ON UNIX AND LINUX

(71) Applicant: Somansa Co., Ltd., Seoul (KR)

(72) Inventors: Seung Tae Paek, Seoul (KR); Tae Wan Kim, Seoul (KR); Il Hoon Choi, Seoul (KR)

(73) Assignee: Somansa Co., Ltd., Seoul (KR)

( * ) Notice: Subject to any disclaimer, the term of this patent is extended or adjusted under 35 U.S.C. 154(b) by 175 days.

(21) Appl. No.: 13/734,283

(22) Filed: Jan. 4, 2013

(65) Prior Publication Data
US 2014/0157426 A1   Jun. 5, 2014

(30) Foreign Application Priority Data
Nov. 30, 2012   (KR) .......................... 10-2012-0138150

(51) Int. Cl.
*H04L 29/06* (2006.01)
*G06F 21/62* (2013.01)

(52) U.S. Cl.
CPC ........ *G06F 21/6245* (2013.01); *G06F 21/6236* (2013.01)
USPC ........................................................ 726/22

(58) Field of Classification Search
CPC ... G06F 21/05; G06F 21/552; G06F 21/6218; G06F 21/6245
USPC ..................................... 726/1, 22, 25; 713/189
See application file for complete search history.

(56) References Cited

U.S. PATENT DOCUMENTS 7,996,373 B1 *   8/2011   Zoppas et al. ................ 707/694

FOREIGN PATENT DOCUMENTS

| JP | 2007004645 A | 1/2007 |
|---|---|---|
| KR | 10-2008-0050840 A | 6/2008 |
| KR | 10-0986998 B1 | 10/2010 |
| KR | 10-1075543 B | 10/2011 |

* cited by examiner

*Primary Examiner* — Edward Zee
(74) *Attorney, Agent, or Firm* — Sughrue Mion, PLLC

(57) ABSTRACT

Provided are an information protection apparatus and system. The information protection apparatus based on Windows, Unix, or Linux includes a first check unit, a second check unit, and a security measure unit. The first check unit checks whether there is a file including monitoring information among a plurality of check target files in a local storage area, according to a predetermined check policy. The second check unit checks whether there is a file including the monitoring information among the check target files in a sharing storage area of a file system that is shared in a network drive type in an NFS scheme. The security measure unit performs a security measure conforming to a predetermined security policy for the file including the monitoring information.

12 Claims, 3 Drawing Sheets

FIG. 4

SMART QUICK SCAN RESULT

1. TARGET SYSTEM INFORMATION: 192.168.1.11(HP-UX 11.23)
2. QUICK SCAN PERFORMED DATE: 2012-11-22 17:34:05(USE TIME: 00 HOURS 26 MINUTES)

OUTPUT OF QUICK SCAN RESULT

| GENERAL FILE | COMPRESSED FILE | | | | | |
|---|---|---|---|---|---|---|
| FILE SIZE | NUMBER OF FILES | AVERAGE CHECK TIME(S) | ESTIMATED USE TIME | TARGET FILE ADJUSTMENT | CHECK DESIGNATION | RESERVATION TIME |
| 1 MB OR LESS | 2345 | 0.9 | 00 HOURS 36 MINUTES | CONFIRMATION/ ADJUSTMENT | 1 | --:-- |
| 1~10 MB | 1253 | 3 | 01 HOURS 48 MINUTES | CONFIRMATION/ ADJUSTMENT | 2 | --:-- |
| 10~50 MB | 998 | 10 | 02 HOURS 48 MINUTES | CONFIRMATION/ ADJUSTMENT | 4 | --:-- |
| 50~100 MB | 663 | 30 | 05 HOURS 30 MINUTES | CONFIRMATION/ ADJUSTMENT | 6 | --:-- |
| 100~500 MB | 26 | 90 | 00 HOURS 42 MINUTES | CONFIRMATION/ ADJUSTMENT | 3 | --:-- |
| 500~1GB | 33 | 180 | 01 HOURS 42 MINUTES | CONFIRMATION/ ADJUSTMENT | RESERVATION | 02:00 |
| 1 GB OR MORE | 56 | 600 | 09 HOURS 18 MINUTES | CONFIRMATION/ ADJUSTMENT | NO CHECK | --:-- |

6
7
RESERVATION
NO CHECK

PERSONAL INFORMATION PROTECTION SYSTEM FOR PROVIDING SPECIALIZED FUNCTION FOR HOST TERMINAL BASED ON UNIX AND LINUX

CROSS-REFERENCE TO RELATED APPLICATIONS

This application claims priority under 35 U.S.C. §119 to Korean Patent Application No. 10-2012-0138150, filed on Nov. 30, 2012, the disclosure of which is incorporated herein by reference in its entirety.

TECHNICAL FIELD

The present disclosure relates to a personal information protection system, and more particularly, to a personal information protection system for protecting personal information on a terminal having a plurality of operating systems (OSs).

BACKGROUND

Recently, personal information is frequently leaking by hacking a web server of Internet shopping mall, and communication site, etc.

As an example, there was an incident in which a hacker disguises as an authorized user by hacking a web server, collects customers' personal information from a database (DB), stores the collected personal information as a file in a specific folder of the web server, and transmits the file to a network, thereby leaking the customers' personal information.

In addition, there was a case that searches files stored in a web server and a DB server to leak personal information.

To prevent such problems, ⌈Personal information Protection Act⌋ and law enforcement notification ⌈Technical Management Protection Measure of Personal information⌋ were enforced in September, 2011. Importance about the protection of personal information increases in terms of compliance.

Moreover, security functions of a firewall and an intrusion detection system (IDS) have been much advanced, but, as in reverse telnet, since hacking technology and programs, in which a remote command transferred from a personal computer (PC) of an external hacker to a web server is disguised as normal Hypertext Transfer Protocol (HTTP) traffic, are being distributed, it becomes more difficult to protect personal information.

In a related art personal information protection system, proposed was a method that downloads data files associated with a homepage of a web server through a diagnosis system in a file transfer protocol (FTP), checks whether the data files include personal information, deletes or encrypts the personal information included in the data files, and again uploads the data files deleted or encrypted.

However, the proposed method can check only a specific directory area that stores data (file and resource for providing a web service) associated with a homepage of a web server.

SUMMARY

Accordingly, the present disclosure provides an information protection apparatus and system for protecting information on a terminal based on Windows, Linux, or Unix and a database of the terminal.

The object of the present invention is not limited to the aforesaid, but other objects not described herein will be clearly understood by those skilled in the art from descriptions below.

In one general aspect, an information protection apparatus based on Windows, Unix, or Linux includes: a first check unit checking whether there is a file including monitoring information among a plurality of check target files in a local storage area, according to a predetermined check policy; a second check unit checking whether there is a file including the monitoring information among the check target files in a sharing storage area of a file system that is shared in a network drive type in a Network File System (NFS) scheme; and a security measure unit performing a security measure conforming to a predetermined security policy for the file including the monitoring information.

In another general aspect, an information protection apparatus based on Unix or Linux includes: a check unit checking whether there is a file including monitoring information among a plurality of check target files in a local storage area, according to a predetermined check policy; and a security measure unit performing a security measure conforming to a predetermined security policy for the file including the monitoring information.

In another general aspect, an information protection system includes: an agent checking whether there is a file including monitoring information among a plurality of monitoring target files in at least one of a local disk and a network storage, and performing a protection measure conforming to a predetermined security policy for the file including the monitoring information, the agent being included in a terminal based on Linux, Unix, or Windows; and a management server checking whether a table including monitoring information is stored in a commercial database, and providing the security policy to the agent.

Other features and aspects will be apparent from the following detailed description, the drawings, and the claims.

BRIEF DESCRIPTION OF THE DRAWINGS

FIG. 4 is a diagram illustrating a smart quick scan result according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
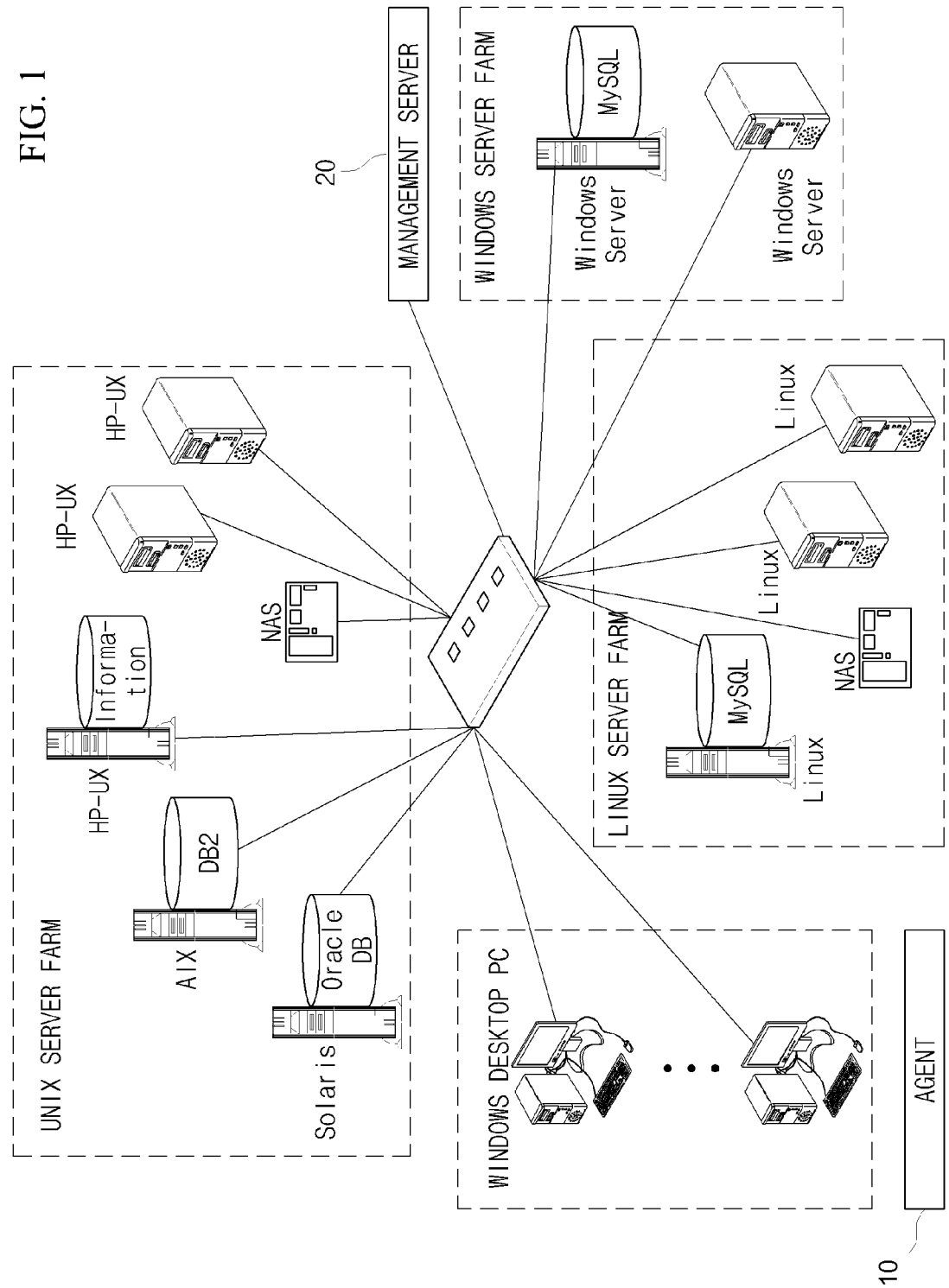
FIG. 1 is a block diagram illustrating an information protection system according to an embodiment of the present invention.

FIG. 1 is a block diagram illustrating an information protection system according to an embodiment of the present invention.

Referring to FIG. 1, the information protection system according to an embodiment of the present invention includes an agent 10 and a management server 20.

The agent 10 is installed in a terminal based on Windows, Unix, or Linux, and checks whether a check target file includes monitoring information. Here, the monitoring information may include personal information such as a resident registration number, a credit card number, an email address, a mobile phone number, a health insurance card number, a passport number, and a telephone number.

In a terminal based on Windows, the agent 10 may be connect to at least one file system among a Unix server, a Linux server, and a network storage through a Network File System (NFS) scheme, and may check whether there is a file including personal information.

The agent 10 periodically downloads a check policy from the management server 20, and checks whether there is a file that includes personal information stored in at least one storage area among a local disk and a network storage according to the check policy. Here, the check policy may be at least one of a check reservation time and a search range (ex, file format, etc) of personal information. In this case, the agent 10 may periodically download a security policy from the management server 20.

When a file that includes monitoring information stored in at least one storage area is detected as a check result, the agent 10 transmits the information and check result of the file to the management server 20.

The agent 10 performs a protection measure for the file including the monitoring information according to the security policy. Furthermore, the agent 10 transmits an event log for the protection measure to the management server 20.

The management server 20 provides a security policy and a monitoring policy, which have been set by a manager, to the agent 10 and receives the information and check result of a file including monitoring information from the agent 10.

The management server 20 checks whether a table including unencrypted monitoring information is stored in a commercial database such as Oracle, DB2, MySql, SyBase, Informix, or AltiBase. When a table including monitoring information is detected, the management server 20 informs the manager of the detected result.

According to the present invention, provided may be an agent that is installed in terminals using the Windows OS of Microsoft such as Window XP, Vista, or Window 7, terminals using Unix OS such as Solaris, HP-UNIX, or AIX, and terminals using Linux OS such as Redhat, Ubuntu, Debian, or SeSE. Therefore, an embodiment of the present invention may provide a protection measure function for protecting personal information to desk top computers for business and terminals for servers such as a file server, a web server, and a DB server.

Moreover, according to an embodiment of the present invention, a file including monitoring information stored in each of local disks is checked even in a Unix server and a Linux server in which a small number of managers manage a plurality of servers, and, a technical protection measure such as the encryption and decryption or complete deletion of a detected file may be performed.

Moreover, according to an embodiment of the present invention, whether there is monitoring information may be checked by an NFS function in a storage area of a server in which the agent 10 cannot be installed, or a sharing storage area of one a Network Attached Storage (NAS) shared by a plurality of servers.

In addition, the present invention may check whether monitoring information is included in a file without separately downloading a check file stored in a web server, and thus can prevent a file from being damaged in a file download/upload operation, thereby preventing the service availability of the web server from being degraded.

Figure 2:
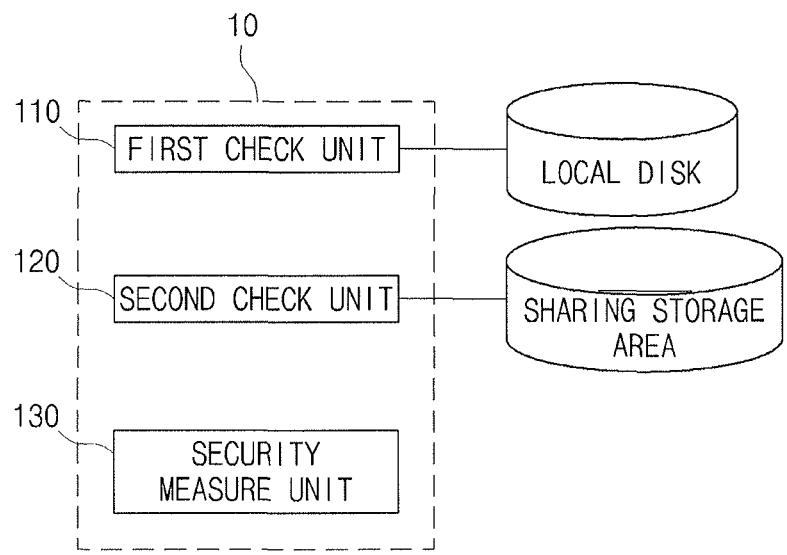
FIG. 2 is a block diagram illustrating an agent according to an embodiment of the present invention.

Hereinafter, an entire configuration of the agent according to an embodiment of the present invention will be described in detail with reference to FIG. 2. FIG. 2 is a block diagram illustrating the agent according to an embodiment of the present invention.

Referring to FIG. 2, the agent 10 includes a first check unit 110, a second check unit 120, and a security measure unit 130.

The first check unit 110 is included in the agent that is installed in a terminal using a Unix or Linux-based OS, and checks whether there is a file including monitoring information among files in a local disk according to a predetermined check policy. Here, the local disk may be a local storage area connected to a Unix or Linux-based terminal.

For example, the first check unit 110 may check whether there is a file including at least one of monitoring information patterns based on a check policy in the local disk through a pattern matching scheme at a check reservation time based on the check policy. Here, the monitoring information pattern may be a pattern that defines monitoring information as a regular expression.

The first check unit 110 may periodically download a check policy, or download the check policy at a time based on a command of the management server 20.

When a file including monitoring information is stored in a local disk, the first check unit 110 transmits at least one of the information and check result of the file to the management server 20.

The second check unit 120 is included in the agent 10 that is installed in a terminal using a Windows-based OS, and checks a sharing storage area connected thereto in a network drive type. In this case, the agent 10 installed in a Unix or Linux terminal cannot check a file that is generated as an application program based on Windows in the sharing storage area, and thus does not include the second check unit 120.

The second check unit 120 may periodically download a check policy from the management server 20, or download the check policy at a time based on a command of the management server 20. Here, the check policy of the second check unit 120 may be equal or similar to the check policy of the first check unit 110, and may differ from the check policy of the first check unit 110.

The second check unit 120 is connected to a sharing storage area of at least one file system of a Unix server, a Linux server, and a network storage by the NFS scheme in the network drive type according to a predetermined check policy, and checks whether there is a file including monitoring information in the sharing storage area.

At this point, the second check unit 120 checks whether there is a file including monitoring information in the sharing storage area corresponding to the at least one file system using a Windows-based resource.

For example, the second check unit 120 may be connected to a sharing storage area connected to the HP-UX Unix system in the NFS scheme. Specifically, the second check unit 120 drives a network file system demon in a Windows-based terminal with the agent 10 installed therein, and exports a sharing directory of a file system of the HP-UX Unix system through the NFS.

Alternatively, the second check unit 120 may be connected to a sharing storage area connected to a system using a Window 7-based OS in the NFS scheme. Specifically, the second check unit 120 sets the use of a service for NFS in the Windows-based terminal with the agent 10 installed therein, adds an NFS network to a network environment, and connects a sharing folder to an NFS-based network drive.

A sharing storage area connected to a terminal including the second check unit 120 may be checked in the terminal in a network drive type. Subsequently, the second check unit 120 may check whether there is a file including monitoring information in the connected sharing storage area.

When there is a file including monitoring information in at least one file system, the second check unit 120 transmits the information and check result of the file to the management server 20.

When a file including monitoring information is detected through the above-described operation, each of the first and second check units 110 and 120 generates a check result including a file format, a file size, the presence of compression, a check time, detected content of monitoring information, and the number of detections of each monitoring information, and transmits the generated check result to the management server 20.

Hereinafter, various check schemes of the first and second check units 110 and 120 will be described in detail. The first and second check units 110 and 120 may perform at least one of the various check schemes.

<<Increment Check>>

Each of the first and second check units 110 and 120 checks all check target files to check whether the files include monitoring information, in the first check. In subsequent checks, each of the first and second check units 110 and 120 may check a file, which has been corrected or newly generated among a plurality of check target files, to check whether the file includes monitoring information. This will be described below in detail.

In the first check, each of the first and second check units 110 and 120 generates index data including file attribute information and protection measure-related information for a plurality of check target files, encrypts the index data, and stores the encrypted index data in a local disk. Here, the check target files may be all or some (corresponding to a check policy, for example, a file of an office application file or a file of an application from which a text stream is extractable) of check target files in an area (i.e., a local disk or a sharing storage area) to be checked by the first and second check units 110 and 120. Also, the file attribute information includes at least one of a path, a file name (including a file extension), a file size, a file generated date, a file corrected date, and a file owner.

The protection measure-related information includes at least one of a check date of a file including monitoring information and a protection measure which has been performed in response to a check result.

In a check after the first check, the first and second check units 110 and 120 check only a corrected file and a newly-generated file to check whether the file includes personal information. Specifically, the first and second check units 110 and 120 may decrypt the encrypted and stored index data, compare file attribute information based on the decrypted index data with file attribute information of a check target file to detect the corrected file and the newly-generated file, and check only the corrected file and the newly-generated file to check whether the corrected file and the newly-generated file include the personal information.

As described above, by performing the increment check, the present invention prevents memory oversharing in an indexing operation of many check target files, and thus prevents the forced termination of the agent 10 or a system error due to the memory oversharing.

<<Effectiveness Verification>>

The first and second check units 110 and 120 verify effectiveness of a check target file through the below-described scheme, and check only a file having effectiveness to check whether the file includes monitoring information.

The following description, for example, will be made on a case in which check target files are a first file from which a text stream is extractable and a second file that is generated in a Windows-based office application program. Here, the file from which the text stream is extractable may be txt, log, dat, jsp, html, or jpg. The Windows-based office application program is an application program which may be installed in a terminal using a Windows-based OS, and for example, which of the file extension may be hwp, doc, docx, ppt, pptx, xls, xlsx, pdf, or gul.

The first and second check units 110 and 120 verify the effectiveness of a check target file based on a file extension type and a file signature. In detail, the first and second check units 110 and 120 check the check target file to check whether an extension type conforming to a file name is matched with a file type conforming to signature information arranged in a header of a file. When the extension type is matched with the file type, the first and second check units 110 and 120 may determine there to be the effectiveness of the file.

For example, when a check target file is aaa.jpg, an extension type of the file is jpg, and thus, a header of the file includes a signature "FF D8 FF E0" of a JPEG file format. Therefore, the first and second check units 110 and 120 check whether the signature "FF D8 FF E0" is included in a header of the file "aaa.jpg", in a pattern matching scheme. When the signature "FF D8 FF E0" is included in the header of the file, the first and second check units 110 and 120 determine there to be the effectiveness of the file.

The first and second check units 110 and 120, as shown in the following Table 1, may verify the effectiveness of a corresponding file using different types of files and unique signatures included in respective headers of the files

TABLE 1

| Header Signature (Hex) | File Type | Description |
|---|---|---|
| D0 CF 11 E0 A1 B1 1A E1 | HWP | HAANSOFT Compound Document File |
| CF 11 E0 A1 B1 1A E1 00 | DOC | Word processor - Perfect Office Document File |
| 50 48 03 04 14 00 06 00 | DOCX, PPTX, XL5X | Microsoft Office Open XML Format Document |
| A0 46 1D F0 (offset: 512 bytes) | PPT | PowerPoint Presentation SubHeader |
| 25 50 44 46 | PDF | Adobe Portable Document Format File |

Although not shown in Table 1, signatures of respective files having different types can be easily understood to those skilled in the art, and thus their description is not provided. Also, a signature of a file may be used as an application for file archiving that backs up a file or Forensic for monitoring and tracking a file.

When there is no effectiveness of a check target file, the first and second check units 110 and 120 regard the check target file as an intentionally modulated file, and transmit the information and effectiveness check result of the check target file to the management server 20. At this point, when abnormal effectiveness is checked from the effective check result, the management server 20 may send a warning message to the manager in real time, thereby enabling the manager to perform an appropriate response measure.

The first and second check units 110 and 120 extract a text stream by decoding a check target file (whose effectiveness has been verified) for each type, check whether monitoring information is included in the extracted text stream, detects a file including monitoring information, and transmits the checked result to the management server 20.

<<Check of Compressed File>>

The first and second check units 110 and 120 may decompress a monitoring target file which has been compressed in a compression format of a Windows-based file such as zip, alz, or bzip, and a Unix or Linux-based compression format such as z, gz, 7z, tar, jar, or war. In this case, even when the monitoring target file is multi-compressed or mixing-compressed, the first and second check units 110 and 120 may release the compression until the original file is extracted, and check the decompressed file.

<<Smart Quick Scan Function>>

When the first and second check units 110 and 120 receive a smart quick scan work command from the management server 20, the first and second check units 110 and 120 newly download a check policy from the management server 20 and update the existing check policy to the downloaded check policy.

The first and second check units 110 and 120 generate second index data in which attribute information of a monitoring target file is included in a sharing storage area or a local disk conforming to the updated check policy, and transmit to the manager server 20. In this case, when there is pre-generated index data, the first and second check units 110 and 120 may generate index data for only a monitoring target file which is not included in index data on the basis of the pre-generated index data.

As described above, various check schemes of the first and second check units 110 and 120 have been described, and, the security measure unit 130 will be described with again reference to FIG. 2.

The security measure unit 130 periodically downloads a security policy from the management server 20 and updates the existing security policy to the downloaded security policy. The security measure unit 130 performs a security measure, conforming to the security policy, for a file including the monitoring information detected by each of the first and second check units 110 and 120. Here, the security policy includes a protection measure for the file including the monitoring information, for example, encryption, complete deletion, and substitution predetermined letters for at least some thereof.

The security measure unit 130 performs a protection function for the file including the monitoring information, and then transmits a log for the protection function to the management server 20.

As described above, the agent according to an embodiment of the present invention checks files by type even without including a library or an Application Program Interface (API) of a Windows-based application program generating a monitoring target file, and thus can protect monitoring information stored in a Unix or Linux server in which a Windows-based application program cannot be installed.

Moreover, the present invention checks whether monitoring information is included in a file, which is generated by a Windows-based word process application program (for example, hwp, doc/docx, pdf, or the like), as well as text stream-based files such as txt, log, dat, jsp, and html.

Moreover, the present invention can overcome the existing limitation that checks only a specific directory area storing data (a resource and a configuration file for providing a web service) associated with a homepage of a web server because the related art of invention manages (downloads or uploads) files in an FTP scheme.

Hereinafter, the management server according to an embodiment of the present invention will be described in detail with reference to FIGS. 3 and 4.

Figure 3:
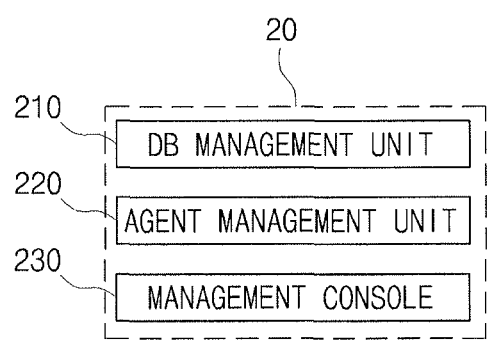
FIG. 3 is a block diagram illustrating a management server according to an embodiment of the present invention.

FIG. 3 is a block diagram illustrating a management server according to an embodiment of the present invention. FIG. 4 is a diagram illustrating a smart quick scan result according to an embodiment of the present invention.

As illustrated in FIG. 3, the management server 20 according to an embodiment of the present invention includes a DB management unit 210, an agent management unit 220, and a management console 230.

The management console 230 provides a user interface for a smart quick scan function, a smart scan function, or manager notification.

The management console 230 provides an interface for checking a file for which a protection measure has been performed by the agent 10, or an interface for remotely decrypting all or a portion of an encrypted file among a plurality of files for which a protection measure has been performed.

Therefore, a manager may check files, for which a protection measure has been performed, in a local disk or a sharing storage area through the management console 230. The manager may decrypt an unnecessarily encrypted file or a file to be decrypted for providing a service among the checked files.

The agent management unit 220 provides a monitoring policy and a security policy to the agent 10, and receives at least one piece of information among information of a file including monitoring information, check result, index data, effectiveness verification result, and processing logs depending on protection measure from the agent 10.

When at least one piece of information is checked, the agent management unit 220 may send a warning message to the manager through an email or a Short Message Service (SMS) according to the setting of the manager.

The agent management unit 220 calculates an average check time for each file size using the check result, in which case the agent management unit 220 may calculate an average check time for each of Windows, Unix, and Linux. The agent management unit 220 applies the calculated average check time to the smart quick scan function.

When the smart quick scan function is set, the agent management unit 220 transfers a smart quick scan work command to the agent 10, and checks whether index data based on a smart quick scan work is received from the agent 10. At this point, when the smart quick scan work command is received, the agent 10 generates index data including file attribute information on all of a check target file, and transmits the index data to the management server 20.

When the index data is received, the agent management unit 220 calculates an estimated use time that is expended in checking a general (uncompressed) file and a compressed file with reference to the presence of file compression and the number of files by file size using the index data. Furthermore, the agent management unit 220 generates a smart quick scan result including the calculated use time and, as shown in FIG. 4, displays the smart quick scan result to the manager.

To this end, when the check result is received from the agent 10, the agent management unit 220 checks an average check time for each file size conforming to an OS, calculates an average of the repetitive check results (ex. at least 3 times) of the agent 10, and uses the calculated average in calculating an estimated use time. Here, when the check result is not provided from the agent 10, the agent management unit 220 uses a system default value.

In detail, the agent management unit 220 checks a smart quick scan result and the size of a check target file to calculate the number of files by file size and multiplies the number of files by file size to a pre-calculated average check time to calculate an estimated use time. Also, the agent management unit 220 may arrange information, such as file formats and file names by file size, in a "target file adjustment" item.

Therefore, the manager according to an embodiment of the present invention may estimate a time that is expended in checking a check target file through a smart quick scan, and effectively plan a check work time in consideration of a server operating condition, a work condition of the manager, or a spare work time.

For example, the manager may designate a check order according to a file size. The manager may check file names in "target file adjustment" item, and exclude files, requiring no check among the checked files, from a check. Also, the manager may designate files requiring much check time to be checked at a night time or a time other than a work time.

When a DB scan function is set, the DB management unit 210 accesses a DB system in which is designated by the manager and access information is set. Here, the access information may be the Internet Protocol (IP) address, port information, user identifier (ID), and password of the DB system.

The DB management unit 210 detects all tables including plaintext-type monitoring information in a DB of the DB system. Here, the DB system checked by the DB management unit 210 may be at least one of Windows OS-based MSSQL database system, Unix or Linux-based Oracle, MySQL, DB2, Informix, SyBase, and Altibase database system, or may be the other DB system.

In this case, the DB management unit 210 may skip a table which is encrypted and thus is impossible to analyze or a table from which monitoring information is not detected, in tables in the DB system.

The DB management unit 210 stores a check result including information of a table including monitoring information.

The DB management unit 210 writes a table list to be checked in a DB in the first check. In subsequent checks, the DB management unit 210 compares a table with tables of a pre-stored table list, and, when the table is a newly generated table, the DB management unit 210 may preferentially check whether the table includes monitoring information.

Even in a case of the pre-stored table list, since contents of a table are changed, the DB management unit 210 may check whether the table includes monitoring information.

The agent management unit 220 and the DB management unit 210 may transmit a check result to the manager in real time through a means such as an SMS or an email, according to setting.

Therefore, before checking files including monitoring information, the present invention may estimate a time that is expended in checking a check target file, and effectively plan a check work time in consideration of a server operating condition, a work condition of the manager, or a spare work time.

Moreover, when there is a table including plaintext-type personal information among tables in a commercial DB, the present invention can induce a protection measure by informing the manager of the table.

According to the present invention, provided can be technology for protecting personal information on a terminal based on Windows, Linux, or Unix.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An information protection apparatus based on Windows, Unix, or Linux, comprising:
   a processor:
   a first check unit executed by the processor, checking whether there is a first file comprising monitoring information among a plurality of check target files in a local storage area, according to a predetermined check policy;
   a second check unit executed by the processor, checking whether there is a second file comprising the monitoring information among the check target files in a sharing storage area of a file system that is shared in a network drive type in a Network File System (NFS) scheme; and
   a security measure unit executed by the processor, performing a security measure conforming to a predetermined security policy for each of the first file comprising the monitoring information and the second file comprising the monitoring information,
   wherein in a first check, the first and second check units generate index data comprising the security measure and file attribute information on the check target files, encrypt the index data, and store the encrypted index data in the local storage area, and
   wherein in subsequent checks, the first and second check units check whether there is a file comprising the monitoring information among files having different file attribute information in the check target files using the index data that is decrypted.

2. The information protection apparatus of claim 1, wherein the first and second check units transmit a check result, comprising at least one of a name of a file comprising the monitoring information, a file size, a file format, a check time, detected contents of the monitoring information, and the number of detections of each monitoring information, to a management server.

3. The information protection apparatus of claim 1, wherein the check target files comprise at least one of a file, generated in a Windows-based office application program which of the file extension is at least one of *.hwp, *.doc, *.docx, *.ppt, *.pptx, *.xls, *.xlsx, *.pdf, and *.gul, and a file from which a text stream is extractable.

4. The information protection apparatus of claim 1, wherein the first and second check units division-check the check target files with respect to the number of files conforming to the check policy.

5. The information protection apparatus of claim 1, wherein when each of the first file and the second file is compressed in a Windows-based compression format or a Unix or Linux-based compression format, each of the first and second check units checks whether the monitoring information is comprised in a decompressed original file.

6. An information protection apparatus based on Windows, Unix, or Linux, comprising:
a processor;
a first cheek unit executed by the processor, checking whether there is a first file comprising monitoring information among a plurality of check target files in a local storage area, according to a predetermined check policy;
a second check unit executed by the processor, checking whether there is a second file comprising the monitoring information among the check target files in a sharing storage area of a file system that is shared in a network drive type in a Network File System (NFS) scheme; and
a security measure unit executed by the processor, performing a security measure conforming to a predetermined security policy for each of the first file comprising the monitoring information and the second file comprising the monitoring information,
wherein the first check unit performs an effectiveness check that checks whether an extension type of the first file is matched with extension information based on signature information extracted from a header of the first file, and checks whether the monitoring information is comprised in the first file which of the effectiveness has been verified as the effectiveness check result, and
wherein the second check unit performs an effectiveness check that checks whether an extension type of the second file is matched with extension information based on signature information extracted from a header of the second file, and checks whether the monitoring information is comprised in the second file which of the effectiveness has been verified as the effectiveness check result.

7. An information protection apparatus based on Unix or Linux, comprising:
a processor;
a check unit executed by the processor, checking whether there is a file comprising monitoring information among a plurality of check target files in a local storage area, according to a predetermined check policy; and
a security measure unit executed by the processor, performing a security measure conforming to a predetermined security policy for the file comprising the monitoring information,
wherein in a first check, the check unit generates index data comprising the security measure and file attribute information on the check target files, encrypts the index data, and stores the encrypted index data in the local storage area, and
wherein in subsequent checks, the check unit checks whether there is a file comprising the monitoring information among files having different file attribute information in the check target files using the index data that is decrypted.

8. The information protection apparatus of claim 7, wherein the check target files comprise at least one of a file, generated in a Windows-based office application program which of the file extension is at least one of *.hwp, *.doc, *.docx, *.ppt, *.pptx, *.xls, *.xlsx, *.pdf, and *.gul, and a file from which a text stream is extractable.

9. An information protection system, comprising:
an agent comprising a processor for checking whether there is a file comprising monitoring information among a plurality of monitoring target files in at least one of a local disk and a network storage, and performing a protection measure conforming to a predetermined security policy for the file comprising the monitoring information, the agent being comprised in a terminal based on Linux, Unix, or Windows; and
a management server comprising a processor for checking whether a table comprising monitoring information is stored in a commercial database, and providing the security policy to the agent,
wherein the agent performs the protection measure, and transmits a check result comprising at least one of a name of the file comprising the monitoring information, a file size, a file format, and a check time, to a management server, and
wherein the management server calculates a check time for each file size based on an operating system using the check result.

10. The information protection system of claim 9, wherein, the agent is connected to the network storage in a network drive type by a Network File System (NFS), and checks whether the file comprising the monitoring information is stored in the network storage, and
when a file generated in a Windows-based application program is stored in the network storage, the agent checks whether the generated file comprising the monitoring information is stored in the network storage using a Windows-based resource.

11. An information protection system, comprising:
an agent comprising a processor for checking whether there is a file comprising monitoring information among a plurality of monitoring target files in at least one of a local disk and a network storage, and performing a protection measure conforming to a predetermined security policy for the file comprising the monitoring information, the agent being comprised in a terminal based on Linux, Unix, or Windows; and
a management server comprising a processor for checking whether a table comprising monitoring information is stored in a commercial database, and providing the security policy to the agent,
wherein when it is requested to check an estimated use time for all checks, the management server requests information to the agent to receive the information on the file, checks the number of monitoring target files by file size, and calculates the estimated use time by multiplying a check time by file size, corresponding to an operating system of a terminal with the agent installed therein, to the number of monitoring target files by file size.

12. The information protection system of claim 11, wherein,
the management server displays a table comprising a file name and a file size, which are comprised in the information of the file, and the estimated use time, and
the table provides an interface for determining a file to be excluded from a check by the agent among the monitoring target files and designating a check order.

* * * * *